United States Patent
Loibl et al.

(10) Patent No.: US 7,612,512 B2
(45) Date of Patent: Nov. 3, 2009

(54) ELECTRONIC CONTROL UNIT FOR CONTROLLING EXTERNAL HALF-BRIDGE POWER OUTPUT STAGES AND AN ELECTRIC MOTOR OPERATED DRIVE WITH ELECTRONIC CONTROL UNIT

(75) Inventors: Josef Loibl, Bad Abbach (DE); Thomas Maier, Neunburg v. Wald (DE)

(73) Assignee: Siemens VDO Automotive AG, Munich (DE)

( * ) Notice: Subject to any disclaimer, the term of this patent is extended or adjusted under 35 U.S.C. 154(b) by 0 days.

(21) Appl. No.: 11/917,003

(22) PCT Filed: Apr. 10, 2006

(86) PCT No.: PCT/EP2006/061490

§ 371 (c)(1),
(2), (4) Date: Jan. 8, 2008

(87) PCT Pub. No.: WO2006/131415

PCT Pub. Date: Dec. 14, 2006

(65) Prior Publication Data

US 2008/0203952 A1    Aug. 28, 2008

(30) Foreign Application Priority Data

Jun. 10, 2005    (DE) .................. 10 2005 026 973

(51) Int. Cl.
*H02P 6/14*    (2006.01)
*H02P 6/00*    (2006.01)
*H02P 7/08*    (2006.01)
*H02P 27/00*    (2006.01)

(52) U.S. Cl. ............. 318/400.29; 318/293; 318/400.21; 318/400.3; 318/400.42

(58) Field of Classification Search ............ 318/400.29, 318/105, 727, 801, 283, 293, 400.21, 400.3, 318/400.4; 363/132, 146; 257/202, 724; 700/7; 361/704, 775

See application file for complete search history.

(56) References Cited

U.S. PATENT DOCUMENTS

| | | | | |
|---|---|---|---|---|
| 6,462,976 | B1 * | 10/2002 | Olejniczak et al. | 363/147 |
| 7,042,086 | B2 * | 5/2006 | Shimoida et al. | 257/724 |
| 7,096,073 | B2 * | 8/2006 | Burkatovsky | 700/7 |
| 7,149,088 | B2 * | 12/2006 | Lin et al. | 361/704 |
| 7,268,515 | B1 * | 9/2007 | Tsai et al. | 318/801 |
| 7,277,763 | B2 * | 10/2007 | Burkatovsky | 700/7 |
| 7,292,451 | B2 * | 11/2007 | Rodriguez et al. | 361/775 |
| 7,317,290 | B2 * | 1/2008 | Gandrud et al. | 318/105 |
| 2005/0274982 | A1 * | 12/2005 | Ueda et al. | 257/202 |
| 2006/0007721 | A1 * | 1/2006 | Rodriguez et al. | 363/146 |
| 2006/0033478 | A1 * | 2/2006 | Patterson | 322/46 |
| 2006/0138993 | A1 * | 6/2006 | Gandrud et al. | 318/727 |
| 2006/0274561 | A1 * | 12/2006 | Ahmed et al. | 363/132 |

* cited by examiner

*Primary Examiner*—Paul Ip
(74) *Attorney, Agent, or Firm*—Laurence A. Greenberg; Werner H. Stemer; Ralph E. Locher

(57) ABSTRACT

In order to control an electromotive drive, a control unit has control modules for controlling half-bridge end power stages. Two of the control modules are pre-configured for alternatively controlling a commutator motor or a brushless electric motor via two half-bridge end power stages. A third control module can be subsequently configured to control a third half-bridge end power stage or two individual switching elements. An electromotive drive ideally can be configured with the stated control unit.

11 Claims, 7 Drawing Sheets

ELECTRONIC CONTROL UNIT FOR CONTROLLING EXTERNAL HALF-BRIDGE POWER OUTPUT STAGES AND AN ELECTRIC MOTOR OPERATED DRIVE WITH ELECTRONIC CONTROL UNIT

BACKGROUND OF THE INVENTION

Field of the Invention

The present invention relates to an electronic control unit for controlling at least three external half-bridge power output stages, which has a control module for each of said half-bridge power output stages.

The present invention additionally relates to an electric motor operated drive incorporating such a control unit.

Generic control units are used for controlling inductive loads such as those constituted e.g. by the coils of individual phases of an electric motor, via associated half-bridge power output stages.

Particularly in automotive engineering, electric motor operated drives are being increasingly used for demand-based, open-loop or closed-loop controlled operation of auxiliary units and actuating functions. Examples include electric motor operated radiator fans, water pumps, interior blower fans as well as actuators for window lifters, sunroofs, convertible tops, seat adjusters, power steering, manual transmissions, differentials, braking systems and many more. In certain cases a plurality of electric motor drives must also be operated in a coordinated or synchronized manner, as is the case, for example, with automatic transmissions (clutch/gearshift), dual clutch transmissions (clutch/clutch) or also twin cooling fans.

For these applications, conventional commutator motors with brushes and, increasingly, electronically commutated, brushless motors are used. To an ever greater extent, the demand-based, open-loop controlled, closed-loop controlled, failsafe and in some cases coordinated operation of these drives requires complex control of the electric motor operated drives e.g. using pulse width modulation, to optimize the power yield, for power regulation and in some cases for synchronization. This generally requires a higher-order intelligent control arrangement comprising a microcontroller, a voltage regulator, the required semiconductor power output stages and associated driver electronics as a control unit for the semiconductor power output stages, said microcontroller, voltage regulator and semiconductor power output stages being variably deployable for the different types of motor. However, the driver electronics must be matched to the relevant application, as a commutator motor is controlled via two semiconductor half bridges connected in an H full-bridge configuration, and a brushless motor via two individual semiconductor half bridges.

A first solution of the problem has been to provide specially configurable driver electronics for two or three half bridges in each situation. FIG. 1A and FIG. 1B illustrate this prior art. FIG. 1A shows the H full-bridge arrangement VB of a commutator motor MK with the associated driver circuit CIC(A). FIG. 1B, on the other hand, shows the arrangement of three semiconductor half bridges HB1, HB2, HB3 for controlling a three-phase brushlessly commutated electric motor MBL with associated driver circuit CIC(B).

Another solution to the problem is to use individual independent driver modules for each semiconductor half bridge, existing solutions providing a half-bridge power output stage together with the associated driver circuit CIC in an integrated manner on a control chip SB. The necessary number of control chips SB must then be combined as required. This prior art is shown in FIG. 2A for a commutator motor MK and in FIG. 2B for a brushless motor MBL.

Depending on which of the existing solutions is selected, an increased complexity in terms of design, construction, manufacturing and assembly as well as in some cases an increased space requirement must be accepted which makes the individual solution more expensive.

The first solution also has the disadvantage that the quantity of driver circuits required is split between the two application scenarios A and B and therefore the individual quantities for the particular driver circuit is lower. This is incompatible with rational production, and thereby ultimately increases the costs.

The disadvantage of the second solution is that the power switching units (MOSFETs) cannot be freely selected from the market on a price-oriented basis. Existing savings potentials cannot therefore be utilized.

BRIEF SUMMARY OF THE INVENTION

The object of the present invention is therefore to specify a variably deployable electronic control unit (control unit for half-bridge power output stages) which can be used for controlling both commutator motors and brushlessly commutated motors, while nevertheless avoiding the disadvantages of existing solutions. This should ultimately reduce the design complexity and at the same time the overall costs for the electric motor operated drive unit.

This object is achieved by an electronic control unit having the features set forth in claim 1 and by an electric motor operated drive having the features set forth in claim 10. Advantageous embodiments and developments which can be used individually or in combination with one another are the subject matter of the dependent claims.

The electronic control unit for controlling at least three half-bridge power output stages (hereinafter referred to simply as half bridges or half-bridge circuits) has a control module for each of the half-bridge power output stages. For controlling an electric motor via two half-bridge power output stages, a first and a second control module are jointly pre-configured on a first common configuration level. At least one third control module is freely configurable on a second configuration level for optionally controlling an individual phase of an electric motor or for use as two simple signal or driver outputs.

The term configuration is to be understood here as meaning the electrical or programmatically logical interconnection or combination of the control modules CM with the connections to the higher-order microcontroller, with the connections to the external switching elements or even with other functional modules of the control unit.

A fixed pre-configuration is present if the configuration is permanently predefined at least in part by an invariant or irreversible electrical interconnection of the control modules during the control unit production process, in the manner of an "application-specific integrated circuit" (ASIC).

On the other hand, free configurability is present if different application-specific interconnections of the control modules can only be established according to the particular application when the control unit is complete, possibly by the user himself. This can be easily done, for example, by external activation of particular integrated functional modules using so-called jumper switches, by bypassing particular pins of the control unit or applying a continuous signal. However, for this purpose there can also be provided a one-time or re-programmable logic array (PLA) which can be freely programmed by the user.

The invention also relates to an electric motor operated drive with coils and permanent magnets in a motor housing, comprising an arrangement of half-bridge power output stages for supplying voltage to the coils and an electronic control unit as described above. The latter is used to control the half-bridge power output stages and is disposed in or on the motor housing of the electric motor operated drive.

The invention may be summarized as follows:

For controlling an electric motor operated drive, a control unit is proposed which has control modules for controlling half-bridge power output stages. Two of the control modules are pre-configured for optionally controlling a commutator motor or a brushless electric motor via two half-bridge power output stages. The third control module is subsequently configurable for controlling a third half-bridge power output stage or two individual switching elements. An electric motor operated drive incorporating the control unit referred to is also proposed.

The invention makes it possible to produce larger quantities of control units of identical design by amalgamating the quantities of control units for commutator motors and brushless motors. This allows rationalization and automation of production and quality assurance procedures as well as miniaturization of the control units. This in turn has a positive effect on the production costs, product quality and ruggedness of the control units.

Further advantages and embodiments of the invention will now be explained in greater detail with reference to examples and the accompanying drawings, in which:

DESCRIPTION OF THE INVENTION

Functionally and nominally identical parts are provided withi the same reference signs in the figures.

Figure 1A:
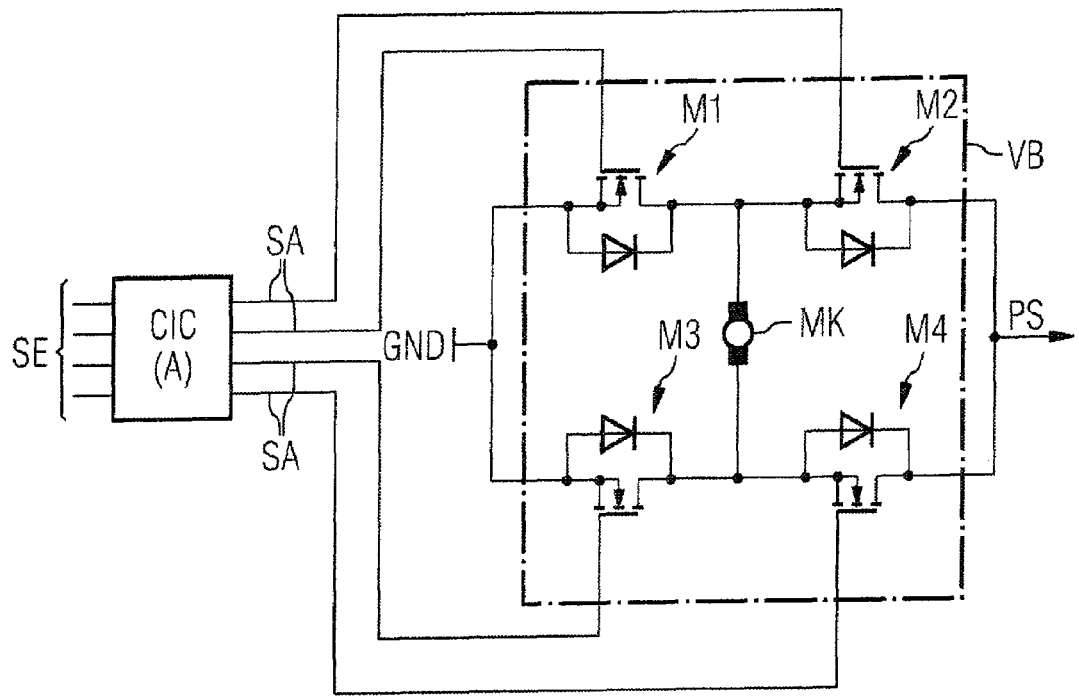
FIG. 1A shows a simplified schematic diagram of an H full-bridge circuit with separate driver circuit for controlling a commutator motor, according to the prior art.

The simplified schematic diagram of an H full-bridge circuit for controlling a commutator motor in FIG. 1A shows a driver circuit CIC (A) with signal inputs SE for connection to a higher-order microcontroller (not shown) and with signal outputs SA according to the prior art. The signal outputs SA are connected to the gate terminals of four field effect transistors (FET) M1, M2, M3 and M4. The four FETs are connected in a full bridge configuration VB, the series connected FETs M1/M2 and M3/M4 forming a bridge arm or a half bridge or half-bridge power output stage in each case. For voltage supply, the end points of the two half bridges are each connected at one end to a power pin PS (positive battery terminal) and at the other end to a ground pin GND (negative battery terminal). The electric motor is a commutator motor MK inserted in a shunt arm between the connection points of the FETs of the two half-bridge power output stages. This is a commonly used method for controlling a commutator motor. The driver circuit CIC (A) is specially designed for this kind of control and cannot be used for other purposes or other motor types.

Figure 1B:
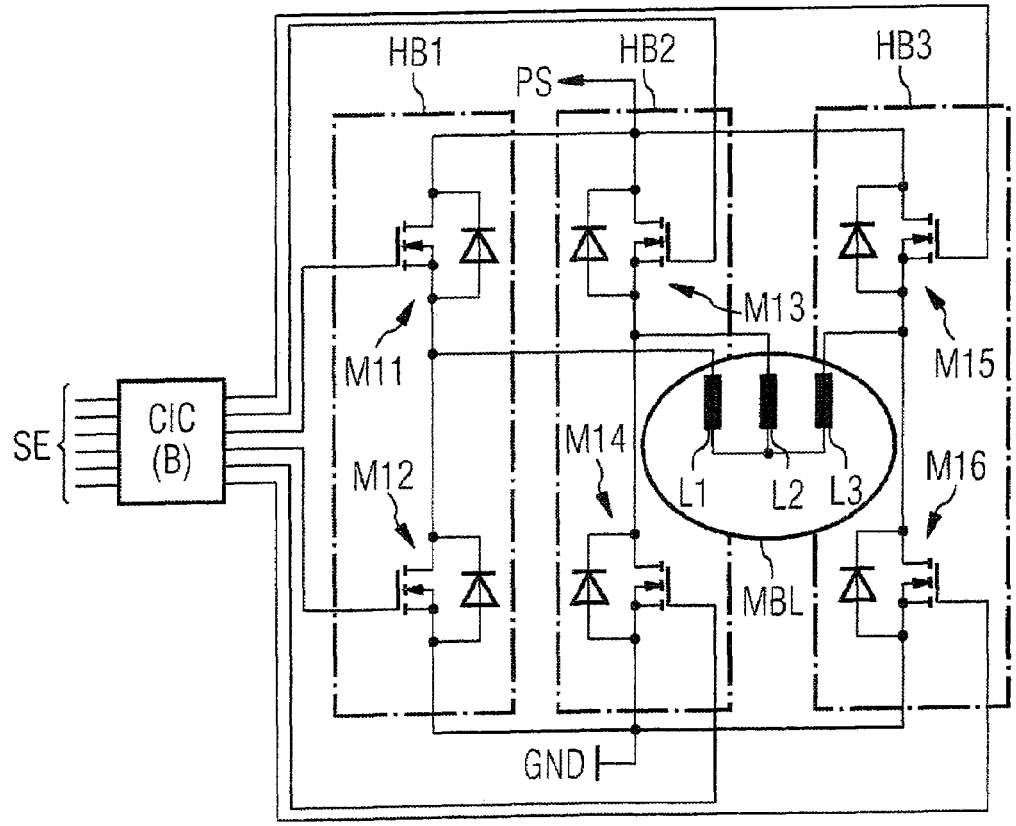
FIG. 1B shows a simplified schematic diagram of an arrangement of three half-bridge circuits with separate driver circuit, for controlling a three-phase brushlessly commutated electric motor, according to the prior art.

The same applies to the driver circuit CIC (B) of the circuit arrangement shown in FIG. 1B for controlling a three-phase brushlessly commutated electric motor MBL with the three phases L1, L2 and L3. This driver circuit CIC (B) also has signal inputs SE for connection to a higher-order microcontroller (not shown) and signal outputs SA which are connected to the gate terminals of six field effect transistors (FETs) M11 to M16. The FETs M11 to M16 are connected pairwise (M11/M12, M13/M14 and M15/M16) in series with the three half-bridge power output stages (half bridges, half-bridge circuit) HB1, HB2 and HB3 respectively. For voltage supply, the end points of the two half bridges are each connected at one end to a power pin PS (positive battery terminal) and at the other end to a ground pin GND (negative battery terminal). A phase L1, L2, or L3 of the brushlessly commutated electric motor MBL is connected to the connection points between the FETs M11/M12, M13/M14 and M15/M16 of the three half-bridge power output stages HB1, HB2 and HB3 respectively. This also constitutes a common prior art circuit arrangement for controlling a brushlessly commutated electric motor. Once again the driver circuit CIC (B) is specially designed for this kind of control and cannot be used for other purposes or other motor types.

FIGS. 2A and 2B again show circuit arrangements for controlling a commutator motor MK (FIG. 2A) and a brushlessly commutated electric motor MBL (FIG. 2B), as already known from the prior art. In both cases a uniform control chip SB is used, but in different quantities.

The control chip SB combines a half-bridge arrangement of two field effect transistors (FETs) with the associated driver circuit CIC in each case to form a closed unit which is connected, for example, to a higher-order microcontroller (not shown in FIGS. 2A and 2B) via signal inputs SE. For voltage supply, each individual control chip SB is connected on one side of the respective half-bridge power output stage (half-bridge circuit) of the FETs to a power pin PS (positive battery voltage) and at the other end of the respective half-bridge circuit to a ground pin GND (negative battery voltage). The load to be driven is connected to the control device at a driver pin TA in each case.

Figure 2A:
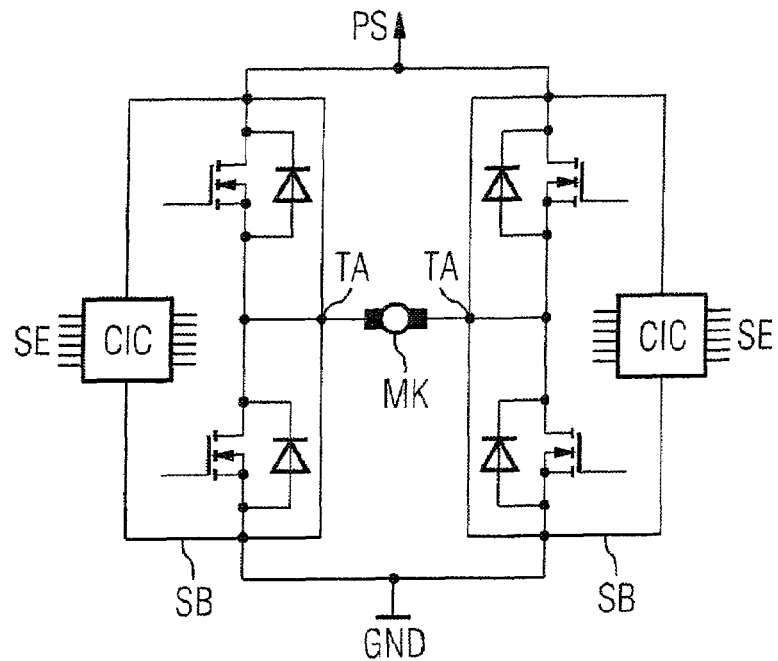
FIG. 2A shows a simplified schematic diagram of an arrangement of two half-bridge control devices, each with integrated driver circuit, for controlling a commutator motor, according to the prior art.

To control a commutator motor MK, as shown in FIG. 2A, two control chips SB are required, the two supply terminals of the motor MK being connected to a driver pin TA in each case.

Figure 2B:
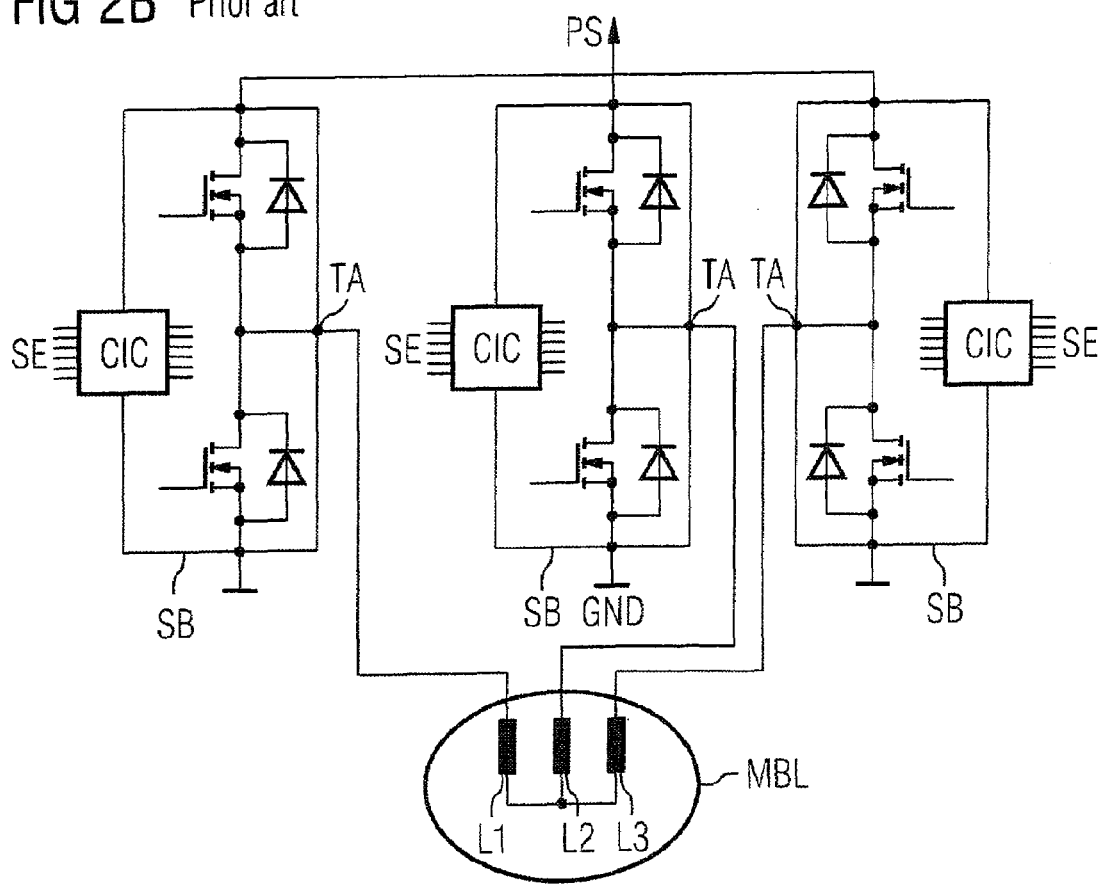
FIG. 2B shows a simplified schematic diagram of an arrangement of three half-bridge control devices, each with integrated driver circuit, for controlling a three-phase brushlessly commutated electric motor, according to the prior art.

To control a brushlessly commutated electric motor MBL, as shown in FIG. 2B, three individual control chips SB are required, the three phases L1, L2 and L3 of the motor MBL each being connected to a driver pin TA of a control chip SB.

Figure 3:
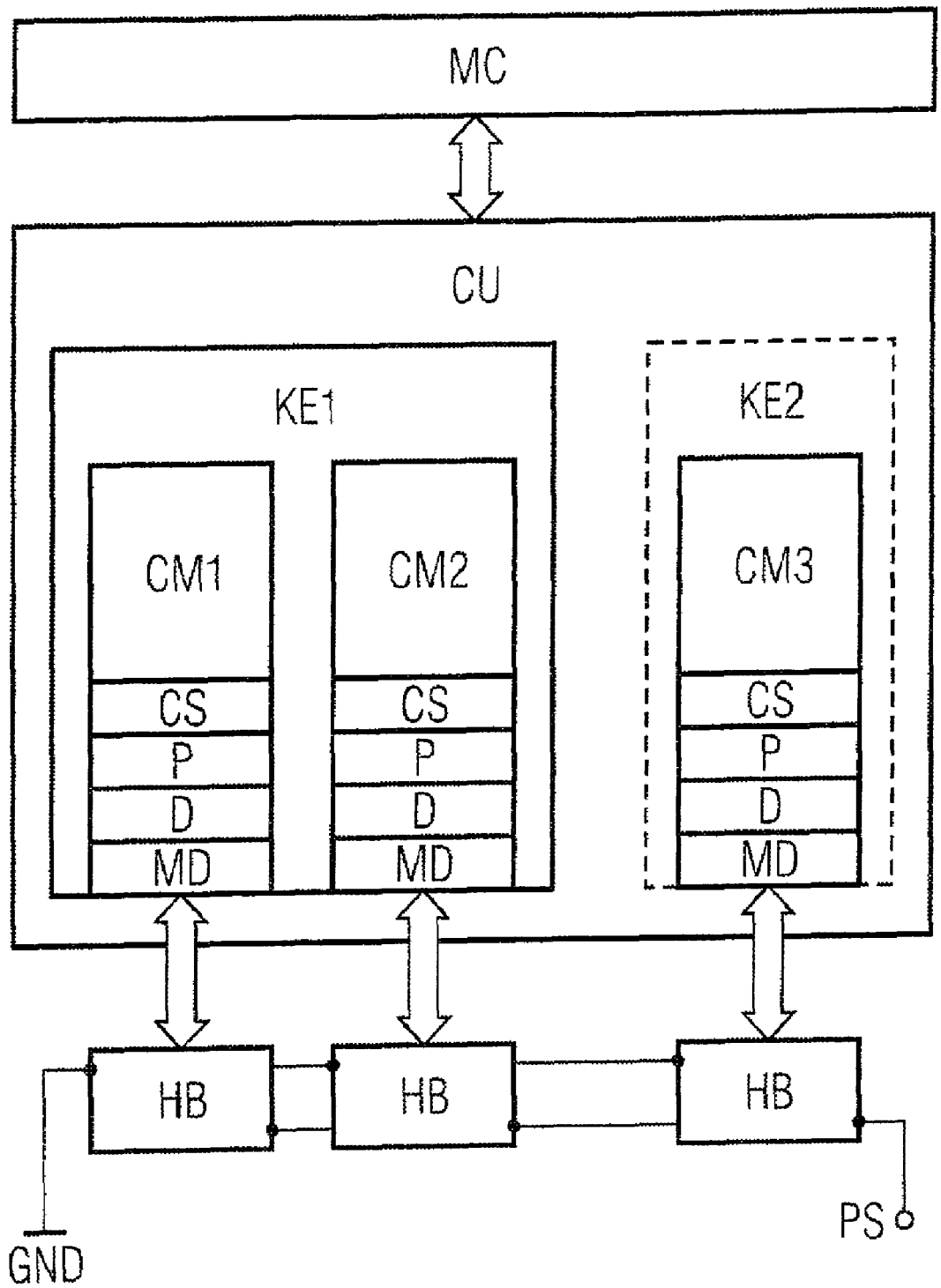
FIG. 3 shows a simplified block diagram of an electronic control unit according to the invention.

The simplified block diagram for explaining the design of an electronic control unit CU according to the invention in FIG. 3 shows such a control unit CU, a microcontroller MC connected thereto and three half-bridge power output stages (half-bridge circuits) HB likewise connected to the control unit CU and therefore having a controlling function, each half-bridge circuit consisting of two switching elements (not shown in FIG. 3) such as field effect transistors, as shown in FIGS. 1A to 2B. However, to construct the half-bridge circuits HB, other switching elements such as relay switches can also be used.

The electrical connection between the units referred to is symbolically illustrated in FIG. 3 by a double arrow. For voltage supply, the three half-bridge power output stages HB are each connected to a power pin PS (positive battery terminal) and a ground pin GND (negative battery terminal). The voltage supply for the control unit CU and microcontroller MC is not shown in FIG. 3.

The control unit CU itself has three control modules CM1, CM2 and CM3 via which the control unit CU is connected to one of said half-bridge power output stages (half-bridge circuits) HB in each case. In the example shown, the control modules CM are themselves provided with different functionalities for controlling the half-bridge circuits. Thus, each of the control modules CM incorporates a half-bridge driver function MD, a diagnostic function D, a protection function P and a current sensing function CS. The driver function MD is used to control the individual switching elements, e.g. field effect transistors, of the half-bridge circuits.

The first control module CM1 and the second control module CM2 are configured on a common configuration level KE1. The third control module CM3 is configured on a separately disposed second configuration level KE2.

The relevant configuration level KE1/KE2 constitutes the platform for configuring the individual control modules in combination or also individually.

Figure 4:
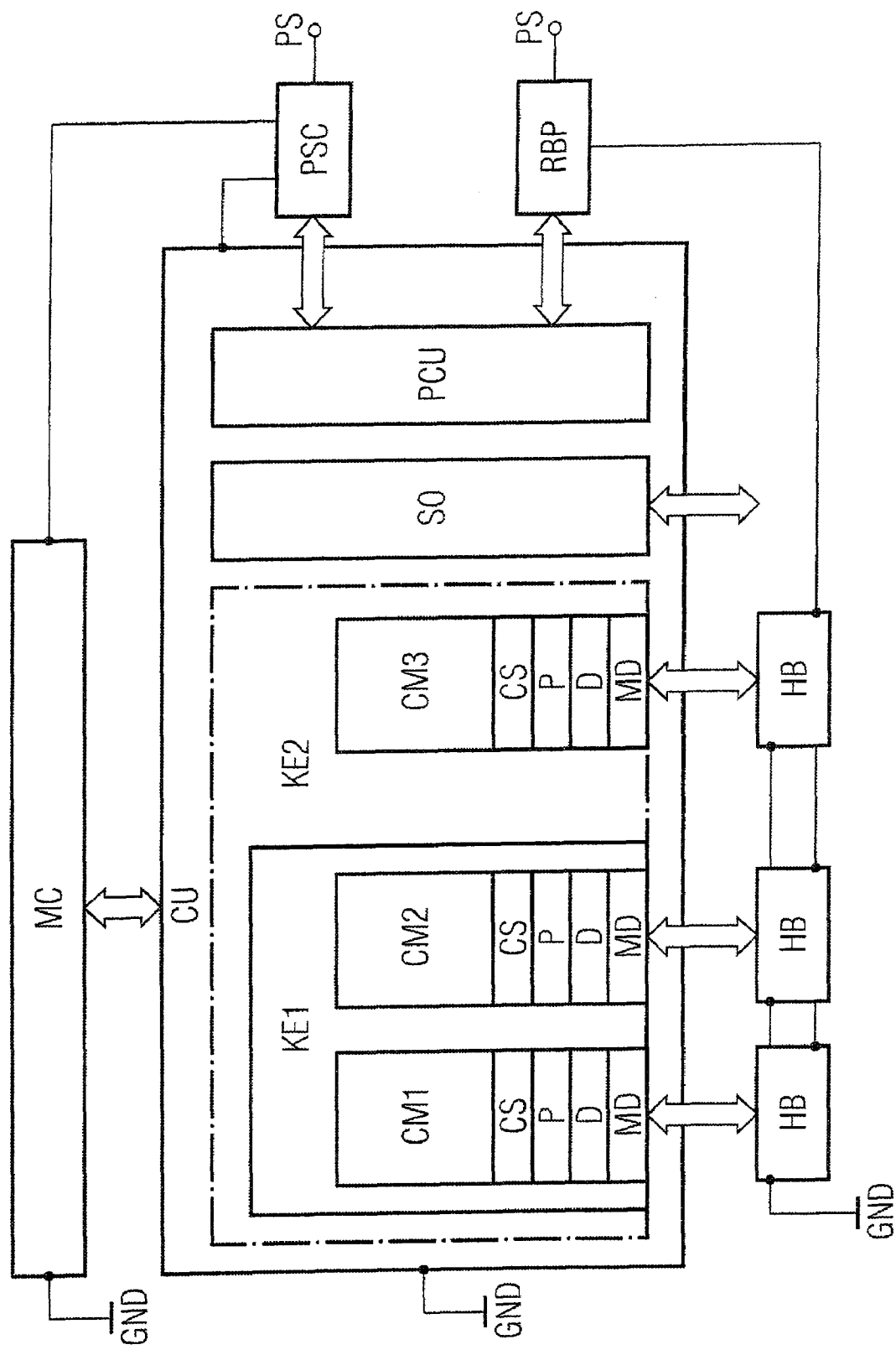
FIG. 4 shows another simplified block diagram of an electronic control unit according to the invention with enhanced functionality.

The simplified block diagram in FIG. 4 shows the design of another electronic control unit CU according to the invention and the microcontroller MC connected thereto, as well as three half-bridge circuits HB likewise connected to the control unit CU and therefore having a controlling function.

In FIG. 4, the electrical connection between the abovementioned units is also symbolically represented by a double arrow in each case. This control unit CU also has three control modules CM1, CM2 and CM3 via which the control unit CU is connected to one of the abovementioned half-bridge power output stages (half-bridge circuits) HB. Analogously to the example in FIG. 3, the control modules CM are again provided with different functionalities for controlling the half-bridge circuits.

In addition to the control modules CM, the control unit CU is equipped with two further functional modules. The first is an additional signal module SO. This signal module SO is used to provide a number of further signal outputs and/or signal inputs which can be used for controlling additional functions or for receiving and possibly processing external electrical signals.

The second additional functional module is the supply voltage control module PCU. It is connected to an external voltage stabilization unit PSC and to the reverse battery protection RBP and controls the operation of these external units.

The three half-bridge circuits HB are connected, on one side, via the reverse battery protection RBP to the power pin PS (positive battery terminal) for protection against battery polarity reversal and, on the other, to a ground pin GND (negative battery terminal). The voltage stabilization unit PSC is used to provide the supply voltage for the microcontroller MC and the control unit CU itself at a controlled predefined value.

The first control module CM1 and the second control module CM2 are on a common configuration level KE1. The configuration level KE1 demarcated by a continuous line in FIG. 4 again symbolizes a fixed pre-configuration of the control modules CM1 and CM2 for controlling two external half bridges. The third control module CM3 is on a separately disposed second configuration level KE2 which overlaps the configuration level KE1. The configuration level KE2 is subsequently configurable by the user, which is in turn symbolized by the dashed-dotted demarcation and shading of the area. On this configuration level KE2, both the control module CM3 and the pre-configured control modules CM1 and CM2 can be overridingly linked to the control module CM3 to form a control unit.

Thus here too the control module CM3 can be configured for controlling a third external half-bridge circuit HB, as shown in FIG. 4 or for controlling individual external power switches (not shown) or even for providing simple electrical output signals.

Figure 5:
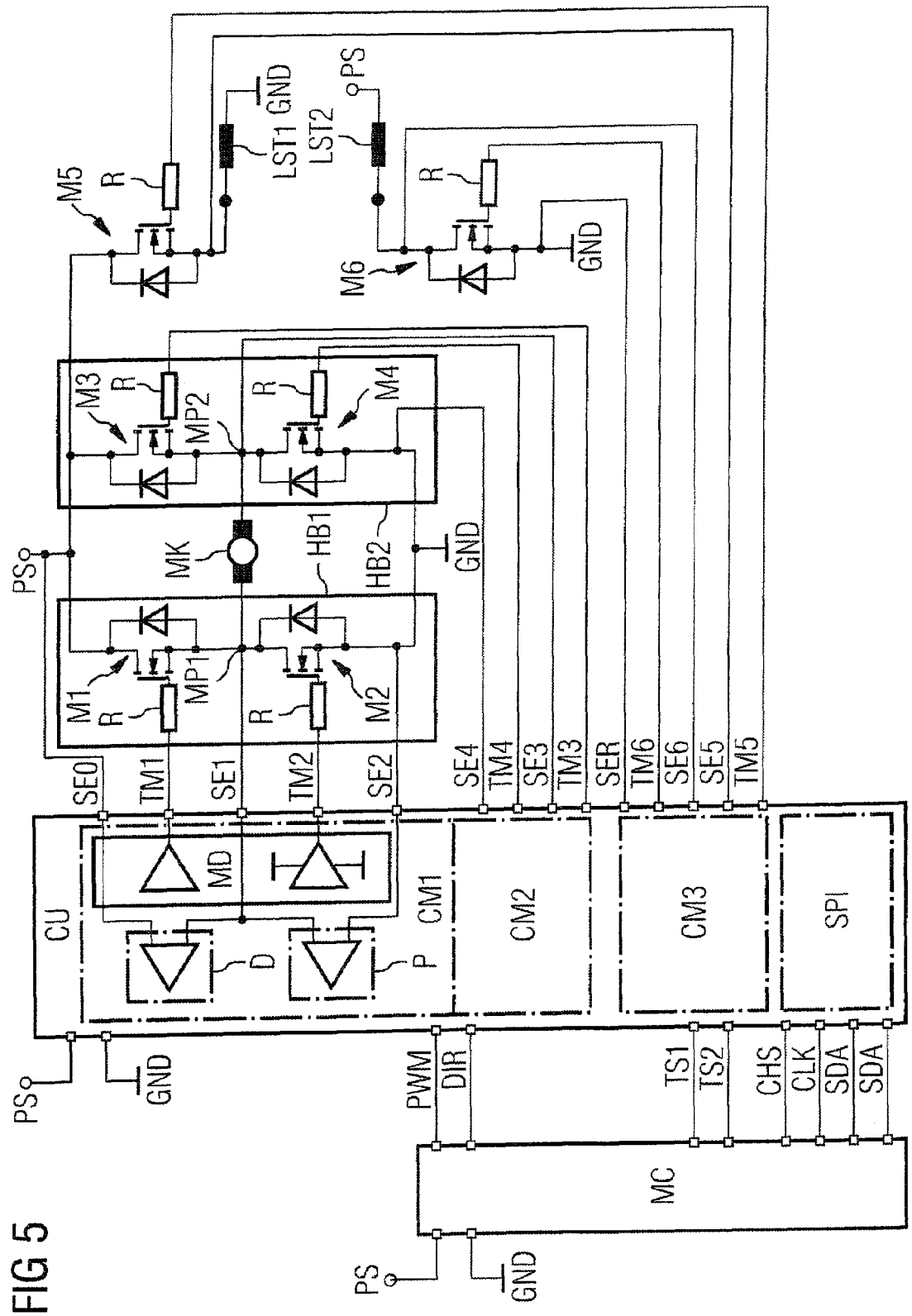
FIG. 5 shows a simplified schematic diagram of a circuit arrangement with control unit according to the invention, configured for controlling a commutator motor and two other signal outputs.

FIG. 5 shows a simplified schematic diagram of a circuit arrangement with control unit according to the invention, configured for controlling a commutator motor MK and with two other driver outputs for controlling two additional loads LST1/LST2 via two power switching elements M5 and M6. The control unit CU has three control modules CM1, CM2 and CM3 for controlling six external switching elements M1 to M6 which are shown as field effect transistors with corresponding circuit symbols in FIG. 5. The control module CM1 is shown by way of example with functional units for performing the half-bridge driver function MD as well as for the protection function P and the diagnostic function D. Although not shown in FIG. 5, these functions are also available in the other control modules.

The first control module CM1 and the second control module CM2 are configured for coordinated control of an electric motor via two half-bridge circuits. The third control module CM3 is configured for separately controlling two other individual power switching elements M5 and M6 via which a first load LST1 and a second load LST2 can be operated respectively.

The control unit CU additionally has an interface module SPI which is designed as a serial interface and is intended for data communication between the microcontroller MC and the control unit CU.

The control unit CU is connected via the serial interface to the higher-order microcontroller MC in a data interchange arrangement via a chip select pin CHS, a clock pin CLK and two serial signal pins SDA. In addition, the control modules can also be configured via this interface SPI by transferring program code.

Other electrical connections between microcontroller MC and control unit CU are provided by the pulse width signal pin PWM, the rotation direction signal pin DIR and the two driver signal pins TS1 and TS2. Via the pulse width signal pin, a pulse width modulation is specified for the control unit CU by the microcontroller MC which represents the power requirement for the electric motor. Via the rotation direction pin DIR, a direction of rotation is specified by the microcontroller MC for the control unit CU which is converted in the control unit CU into control signals corresponding to the rotation direction requirement for the switching elements M1/M2/M3/M4 of the half-bridge power output stages HB1/HB2. Via the two driver signal pins TS1/TS2, a switching requirement is set by the microcontroller MC for the loads LST1/LST2 to be switched via the control unit CU and the switching elements M5/M6. Both the microcontroller MC and the control unit CU are connected to a supply voltage via the power pin PS and the ground pin GND.

The first and second switching element M1/M2 and the third and fourth switching element M3/M4 are connected to a first half-bridge circuit HB1 and a second half-bridge circuit HB2 respectively. The bridge mid-point MP1 of the first half-bridge circuit HB1 constitutes the first power pin and the bridge mid-point MP2 of the second half-bridge circuit HB2 constitutes the second power pin for the commutator motor MK. The two half-bridge circuits are connected at one end to the ground pin GND and at the other end to a power pin of a power supply.

The switching elements M1/M2 of the first half-bridge circuit (half-bridge power output stage) HB1 are connected via a series resistor R to the driver pins TM1 and TM2 of the half-bridge driver function MD of the first control module CM1. Similarly, the switching elements M3/M4 of the second half-bridge circuit HB2 are connected via a series resistor R to the driver pins TM3 and TM4 of the second control module CM2. There is also an electrical connection between a point in the common supply line of the half-bridge circuits to the power pin and a signal input SE0 of the control unit CU. There are other electrical connections between the control unit CU and the half-bridge circuits HB1 and HB2 between the bridge mid-points MP1 and MP2 and the signal inputs SE1 and SE3 respectively and between the relevant ground pin line of the half-bridge circuits HB1 and HB2 and the signal inputs SE2 and SE4 respectively. The signals injected into the control unit in this way are used there to perform the diagnostic function D (pin SE0) and the protection function P and are fed to the corresponding functional units D/P of the control modules CM1 and CM2.

The power switching elements M5 and M6 are connected via series resistors R to the third control module CM3 at the driver pins TM5 and TM6 respectively of the control unit CU.

The switching element M5 is designed as a so-called high-side switching element and is inserted between the power pin PS and the ground pin GND, the load LST1 to be switched being disposed between the ground pin and the switching element. The control module CM3 is electrically connected via the signal pin SE5 to a measuring point in the power line between load LST1 and switching element M5. The signal injected into the control unit CU in this way is used there for performing the protection function P.

The switching element M6 is implemented as a so-called LOW-side switching element and is inserted between the power pin PS and the ground pin GND, the load LST2 to be switched being disposed between the power pin PS and the switching element M6. The control module CM3 is electrically connected via the signal pin SE6 to a measuring point in the power line between load LST1 and switching element M6. The signal injected into the control unit CU in this way is likewise used there for performing the protection function P.

Figure 6:
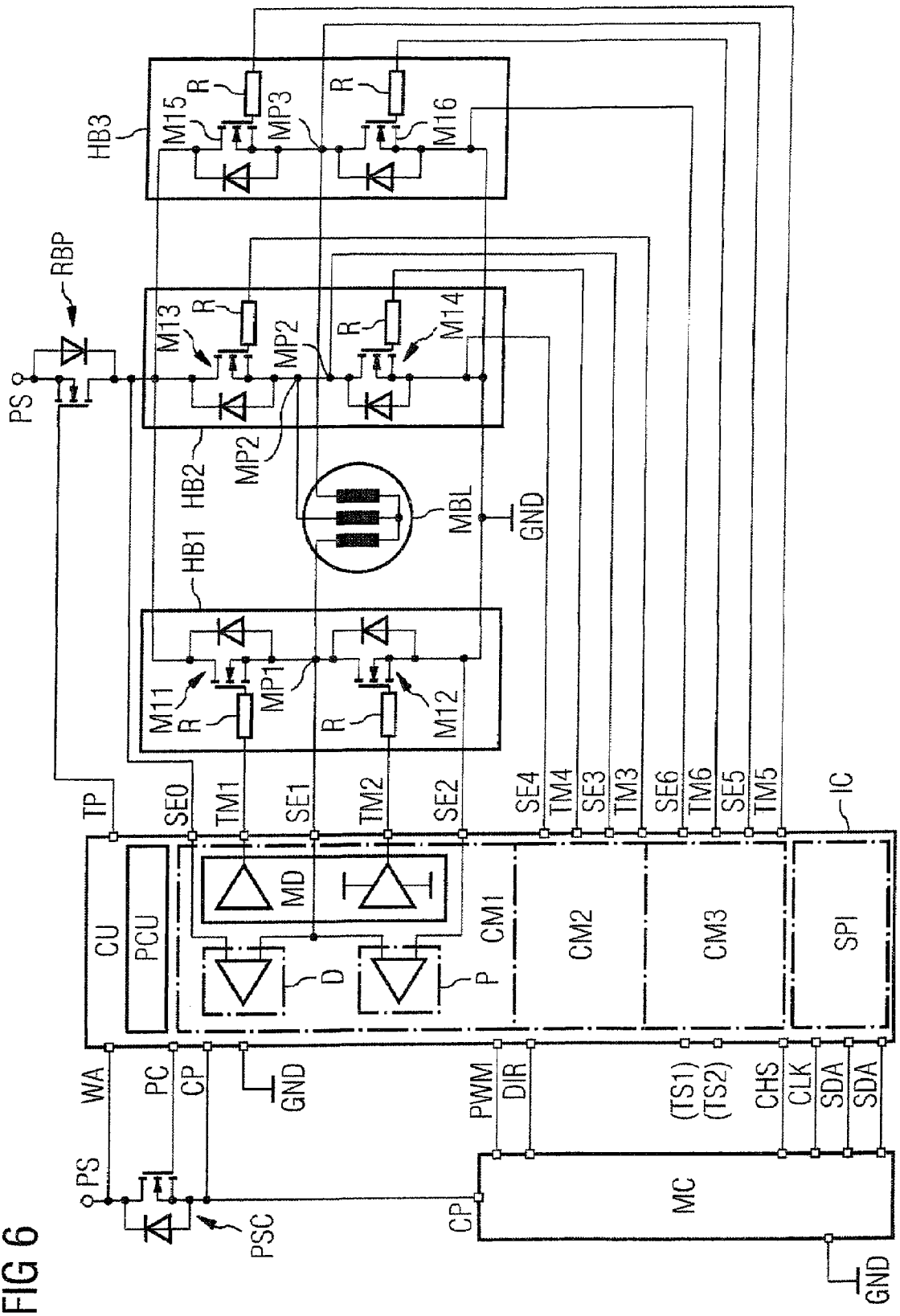
FIG. 6 shows a simplified schematic diagram of a circuit arrangement with control unit according to the invention, configured for controlling a three-phase brushlessly commutated electric motor.

FIG. 6 shows a simplified schematic diagram of another circuit arrangement with control unit according to the invention, configured for controlling a brushlessly commutated electric motor. The control unit CU comprises the control modules CM1, CM2 and CM3 for controlling six external switching elements M1 to M6 which are illustrated in FIG. 6 as field effect transistors with corresponding circuit symbols. By way of example, the control module CM1 is shown with functional units for performing the half-bridge driver function MD as well as the protection function P and the diagnostic function D. Although not shown in FIG. 6, these functions are also available in the other control modules CM2, CM3. The first control module CM1, the second control module CM2 and the third control module CM3 are jointly configured for coordinated control of the brushless electric motor MBL shown via the three half-bridge circuits (half-bridge power output stages) HB1, HB2, HB3 assigned to the three motor phases.

In this example the control unit CU also has an interface module SPI which is designed as a serial interface and is provided for data communication between the microcontroller MC and the control unit CU. The control unit CU is connected via the serial interface to the higher-order microcontroller MC in a data interchange arrangement via a chip select pin CHS, a clock pin CLK and two serial signal pins SDA. In addition, the control modules can also be configured via this interface SPI by transferring program code.

Other electrical connections between microcontroller MC and control unit CU are provided by the pulse width signal pin PWM, the rotation direction signal pin DIR. The two driver signal pins TS1 and TS2 of the control unit CU are unassigned in this case. Via the PWM pin, a pulse width modulation is specified for the control unit CU by the microcontroller MC which represents the power requirement for the electric motor. Via the rotation direction pin DIR, a direction of rotation is specified by the microcontroller MC for the control unit CU which is converted in the control unit CU into control signals corresponding to the rotation direction requirement for the switching elements M1/M2/M3/M4/M5/M6 of the half-bridge power output stages HB1/HB2/HB3.

The first and second switching element M11/M12, the third and fourth switching element M13/M14 and the fifth and sixth switching element M15/M16 are interconnected with a first half-bridge circuit HB1, a second half-bridge circuit HB2 and a third half-bridge circuit HB3 respectively. The bridge mid-points MP1, MP2 and MP3 of the first, second and third half-bridge circuits HB1, HB2 and HB3 constitute the first, second and third power pin for the three phases of the brushless electric motor MBL.

The three half-bridge circuits HB1, HB2 and HB3 are jointly connected at one end to the ground pin GND and at the other end to the power pin of a reverse battery protection device RBP, in the form of a power transistor, and via the latter to the power supply PS.

The control unit CU shown in FIG. 6 additionally has a supply voltage control module PCU which is connected via the driver pin TP to the reverse battery protection RBP for the power supply of the half-bridge circuits HB1, HB2 and HB3. Said reverse battery protection RBP is disposed in the common power supply line of the half-bridge circuits HB1, HB2 and HB3 between the half-bridge arms and the power pin PS. If, for example, reverse polarity of the battery is detected by the supply voltage control module PCU, the reverse battery protection RBP is activated for the half-bridge power output stages HB1, HB2 and HB3 via the driver pins TP.

Using a voltage stabilization unit PSC, the microcontroller MC and the control unit CU are supplied with power via the supply pins CP on the one hand and the ground pins GND on the other. The voltage stabilization unit PSC is connected in a control arrangement with the supply voltage control unit PCU via the driver pin PC. The control unit CU is directly connected to the power pin PS via the additional activation pin WA. When the control unit CU is started up, supply voltage is first applied to the activation pin WA and the supply voltage control module PCU is put into operation, causing a supply voltage controlled via the voltage stabilization unit PSC to be provided.

The switching elements M1/M2 of the first half-bridge circuit HB1 are each connected via a series resistor R to the driver pins TM1 and TM2 of the half-bridge driver function MD of the first control module CM1. Similarly, the switching elements M3/M4 of the second half-bridge circuit HB2 and the switching elements M5/M6 of the third half-bridge circuit HB3 are connected, via a series resistor R in each case, to the driver pins TM3 and TM4 of the second control module CM2 and TM5 and TM6 of the third control module CM3 respectively. An electrical connection also exists between a point in the common supply line of the half-bridge circuits to the power pin and a signal input SE0 of the control unit CU. There are further electrical connections between the control unit CU and the half-bridge circuits HB1 and HB2 between the bridge mid-points MP1, MP2 and MP3 and the signal inputs SE1, SE3 and SE5 respectively and also between the ground pin line of the half-bridge circuits HB1, HB2 and HB3 and the signal inputs SE2, SE4 and SE6 respectively. The signals injected into the control unit in this way are used there for performing the diagnostic function D (pin SE0) and the protection function P and are fed to the corresponding functional units D/P of the control modules CM1, CM2 and CM3. If, for example, a malfunction of the electric motor MBL is diagnosed using the injected signals, rapid and possibly corrective action can be taken by means of control routines stored in the control unit CU and by outputting corresponding driver values to the switching elements M11, ..., M16.

FIGS. 3 to 6 always show the control unit as a closed entity. In a simple implementation, this unit can consist of a substrate with individual components mounted and interconnected thereon, it being advantageous if at least some of the functional units such as the control modules consist of integrated circuits.

In a further integration stage, the configuration level KE1 for the two pre-configured control modules CM1, CM2 can be implemented as an application-specific integrated circuit (ASIC) and the configuration level KE2 for the freely configurable control module CM3 as a program-controlled microcontroller. This possibly allows the use of standard components and therefore helps to reduce manufacturing costs.

It is particularly advantageous for reducing the size and simplifying the assembly activities if the control unit and all the required circuitry and functions are combined in one integrated device. This results in a very compact, rugged construction of the control unit which in turn enables the control unit to be disposed close to the electric motor, possible in the same housing as the motor.

Figure 7:
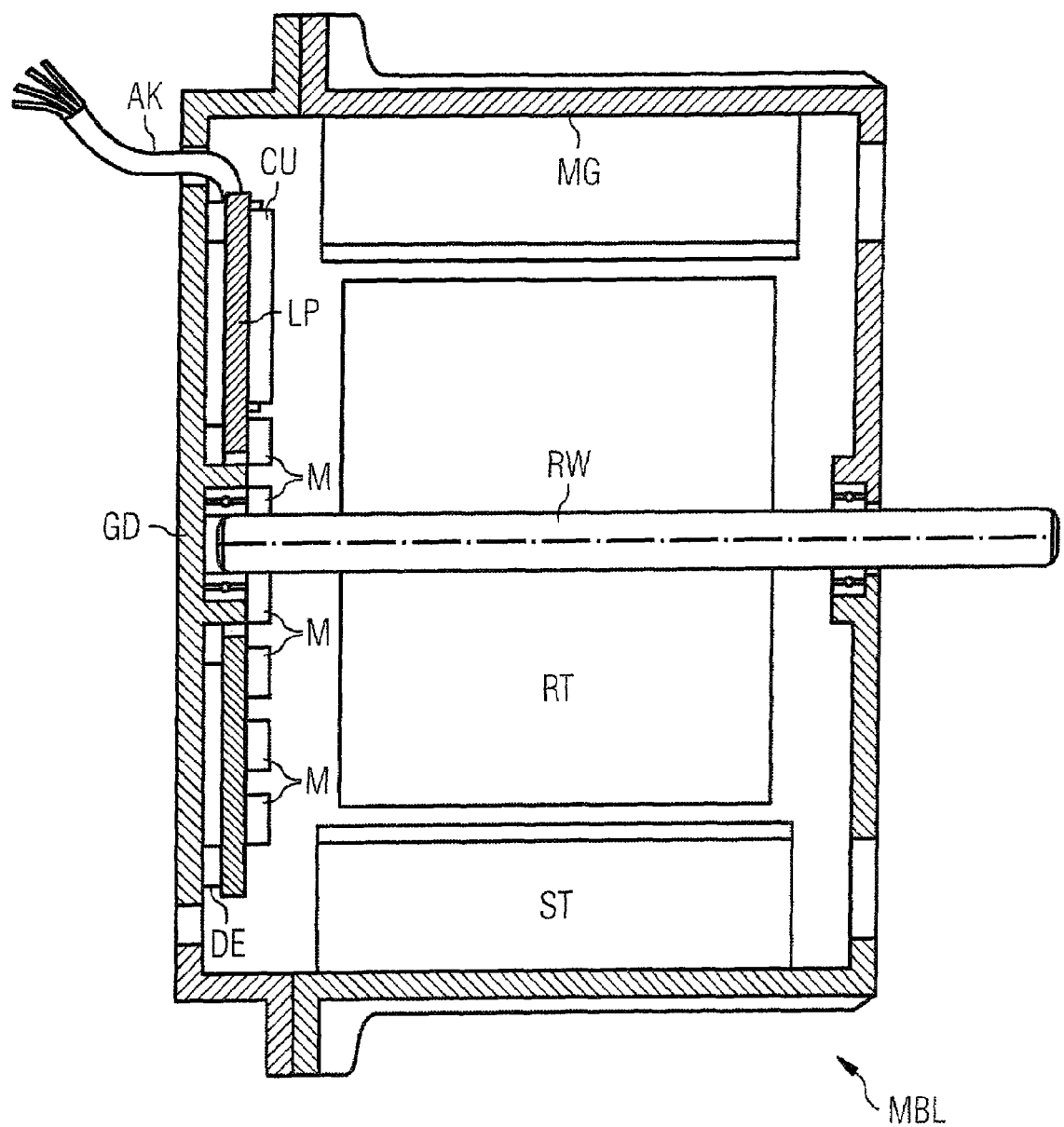
FIG. 7 shows a simplified schematic diagram of an electric motor operated drive according to the invention, associated with a control unit according to the invention.

The simplified layout diagram in FIG. 7 shows an electric motor operated drive according to the invention combined with a control unit according to the invention. The motor is a brushless electric motor MBL with a wound stator ST and a permanent magnet excited rotor RT on a rotor shaft RW. The motor comprised of these components is accommodated in a pot-type motor housing MG with a rear housing cover GD. A substrate LP in the form of a circuit board is mounted on the inside of the rear housing cover GD via damping elements DE. This substrate LP supports the control unit CU according to the invention in the form of an integrated circuit and six power switching elements M which are interconnected on the substrate to form three half-bridge circuits and with the control unit CU. The connecting lines to the power supply and for connection to an external microcontroller are routed away from the substrate LP and out of the motor housing MG by means of a connecting cable AK.

The present invention may be summarized as follows: For controlling an electric motor operated drive MK/MBL, a control unit CU is proposed comprising control modules CM1/CM2/CM3 for controlling half-bridge power output stages HB1/HB2/HB3. Two of the control modules CM1/CM2 are pre-configured for controlling either a commutator motor MK or a brushless electric motor MBL via two half-bridge power output stages HB1/HB2. The third control module CM3 is subsequently configurable for controlling a third half-bridge power output stage HB3 or two individual switching elements M. Also proposed is an electric motor operated drive MK/MBL incorporating the above-mentioned control unit CU.

The invention makes it possible to produce large quantities of identical control units by amalgamating the quantities of control units for commutator motors and brushless motors. This allows rationalization and automation of production and quality assurance procedures, which in turn has a positive impact on production costs and product quality. The invention also provides a very compact and rugged construction of the control units which can therefore be disposed directly on or in the electric motor operated drive unit.

The invention claimed is:

1. An electronic control unit for controlling at least three external half-bridge power output stages, the electronic control unit comprising:
control modules, one of said control modules connected to each of the half-bridge power output stages, said control modules including a first control module, a second control module and at least one third control module all having outputs, said first and second control modules being jointly pre-configured for controlling an electric motor via two of the half-bridge power output stages on a first common configuration level, said at least one third control module being on a second configuration level and freely configurable such that said outputs of said third control module are available for controlling an individual phase of the electric motor, and such that in an alternate configuration, one said outputs of said third control module is available for controlling a first power switching element for operating a first load and another one said outputs of said third control module is available for controlling a second power switching element independently with respect to said first power switching element, the second powers witching element for operating a second load.

2. The control unit according to claim 1, wherein on said second configuration level, said first and second control modules can be selectively configured for controlling a commutator motor or for controlling two phases of a three-phase brushlessly commutated electric motor.

3. The control unit according to claim 1, further comprising an additional control module for controlling an external electrical voltage supply.

4. The control unit according to claim 1, further comprising an additional control module with at least one other signal output.

5. The control unit according to claim 1, further comprising an interface for connecting to an external, higher-order arithmetic logic unit.

6. The control unit according to claim 1, wherein at least one of said control module for a respective one of the half-bridge power output stages has functional elements for at least one of transistor control, current sensing, overload detection and overload protection.

7. The control unit according to claim 1, further comprising integrated circuits forming said first, second and third control modules.

8. The control unit according to claim 7, wherein said first and second control modules are application-specific integrated circuits and said third control module is a software-controlled microcontroller.

9. The control unit according to claim 7, further comprising an integrated device, said control modules are combined in said integrated device.

10. The control unit according to claim 1, further comprising an interface for connecting to a microcontroller.

11. An electric motor operated drive, comprising:
  a motor housing;
  coils disposed in said motor housing;
  permanent magnets disposed in said motor housing;
  a configuration of half-bridge power output stages for supplying voltage to said coils; and
  an electronic control unit connected to and controlling said half-bridge power output stages, said electronic control unit disposed one of in said motor housing and on said motor housing, said electronic control unit containing: control modules, one of said control modules connected to each of said half-bridge power output stages, said control modules including a first control module, a second control module and at least one third control module all having outputs, said first and second control modules being jointly pre-configured for controlling the electric motor operated drive via two of said half-bridge power output stages on a first common configuration level, said at least one third control module being on a second configuration level and freely configurable such that said outputs of said third control module are available for controlling an individual phase of the electric motor operated drive and such that in an alternate configuration, one said outputs of said third control module is available for controlling a first powers witching element for operating a first load and another one said outputs of said third control module is available for controlling a second power switching element independently with respect to said first power switching element, the second power switching element for operating a second load.

* * * * *